United States Patent [19]

Adachi

[11] 4,015,881
[45] Apr. 5, 1977

[54] BRAKE CONTROL DEVICE

[75] Inventor: Yoshiharu Adachi, Toyota, Japan

[73] Assignee: Aisin Seiki Kabushiki Kaisha, Kariya, Japan

[22] Filed: July 15, 1974

[21] Appl. No.: 488,458

[30] Foreign Application Priority Data

July 28, 1973 Japan .............................. 48-85239

[52] U.S. Cl. .................................. 303/114; 60/548; 60/550; 60/551; 60/581; 60/593; 91/391 R

[51] Int. Cl.² ............................................ B60T 8/06

[58] Field of Search ............ 60/547, 550, 582, 552, 60/553, 548, 551, 581, 593; 303/21 F, 21 FB, 10, 114; 91/370, 391 R, 434

[56] References Cited

UNITED STATES PATENTS

| 2,953,936 | 9/1960 | Wiley | 60/581 |
|---|---|---|---|
| 3,253,409 | 5/1966 | Kellogg et al. | 60/547 X |
| 3,327,479 | 6/1967 | Harness et al. | 60/550 |
| 3,466,099 | 9/1969 | Schultz | 303/10 X |
| 3,586,388 | 6/1971 | Stelzer | 303/21 FB |
| 3,659,905 | 5/1972 | Goulish | 303/21 FB |
| 3,675,422 | 7/1972 | Drutchas et al. | 60/582 X |
| 3,724,210 | 4/1973 | Kobashi | 60/582 X |
| 3,796,134 | 3/1974 | Kaptrosky | 60/548 |
| 3,827,759 | 8/1974 | Belart | 60/582 X |
| 3,888,547 | 6/1975 | Ron | 60/551 |

Primary Examiner—Martin P. Schwadron
Assistant Examiner—Abraham Hershkovitz
Attorney, Agent, or Firm—Pierce, Scheffler & Parker

[57] ABSTRACT

The invention relates to a brake control device including, a pump driven by an engine, a brake pedal actuated by a vehicle driver, wheel brake cylinders, manual operating means operatively connected with the brake pedal, pressure control valve means having a hollow seat member provided with a normally open-passage therein and a valve seat thereon and conrolling the hydraulic fluid to the pump according to the actuation of the manual operating means, flow regulating valve means having a variable orifice and a fixed orifice and supplying the hydraulic fluid to the passage of the pressure control valve means through the fixed orifice, power piston means actuated according to the actuation of the pressure control valve means, and master cylinders operatively connected with the power piston means for supplying the fluid pressure to the wheel brake cylinders.

5 Claims, 2 Drawing Figures

BRAKE CONTROL DEVICE

BACKGROUND OF THE INVENTION

1. Field of the Invention

This invention relates generally to a brake control device for vehicles and more particularly to a brake control device provided with a brake booster having an anti-skid actuating function.

2. Description of the Prior Art

In a conventional anti-skid control device, a master cylinder and a power piston of a brake booster fluidically separated therefrom are operatively connected to each other to thereby permit the master cylinder to be fluidly and operatively connected with wheel brakes. In the anti-skid actuation, a control valve of the brake booster and an actuating chamber for providing a high pressure to the power piston are separated by an anti-skid valve from each other, and this high pressure within the actuating chamber is decreased and again increased and the brake controlling is attained.

However, in this conventional anti-skid control device, the anti-skid valve is required to interpose between the actuating chamber and the control valve in addition to the control valve of the brake booster, and further a changeover valve according to the changing speed of the pressure is also required for changing the changing speed of the pressure according to the lock state of vehicle wheels. Accordingly, the structure is very complicated and is disadvantageous in space.

In this invention, the control valve and the anti-skid valve of the brake booster are formed integrally with each other, and this integrally formed pressure control valve is opened by a little force in proportion to the operating force of the brake booster and receives an electric signal of a controlling logic circuit communicated with a wheel sensor in the anti-skid actuation and is then retracted by a solenoid coil in accordance with the lock state of the vehicle wheel, whereby pump pressure proportionately generated by the operating force of the brake booster and acted on the power piston is capable of controlling in proportion to the signal of the controlling logic circuit so that a simplified structure which is low in cost may be provided.

SUMMARY OF THE INVENTION

It is therefore an object of the invention to provide an improved brake control device for vehicles for obviating the above conventional drawbacks.

Another object of the present invention is to provide an improved brake control device for vehicles which is inexpensive to construct.

Still another object of the present invention is to provide a new and simplified brake control device for vehicles.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference numerals designate like or corresponding parts throughout the several views and wherein.

DETAILED DESCRIPTION OF THE PREFERRED EMBODIMENTS

Figures 1, 2:
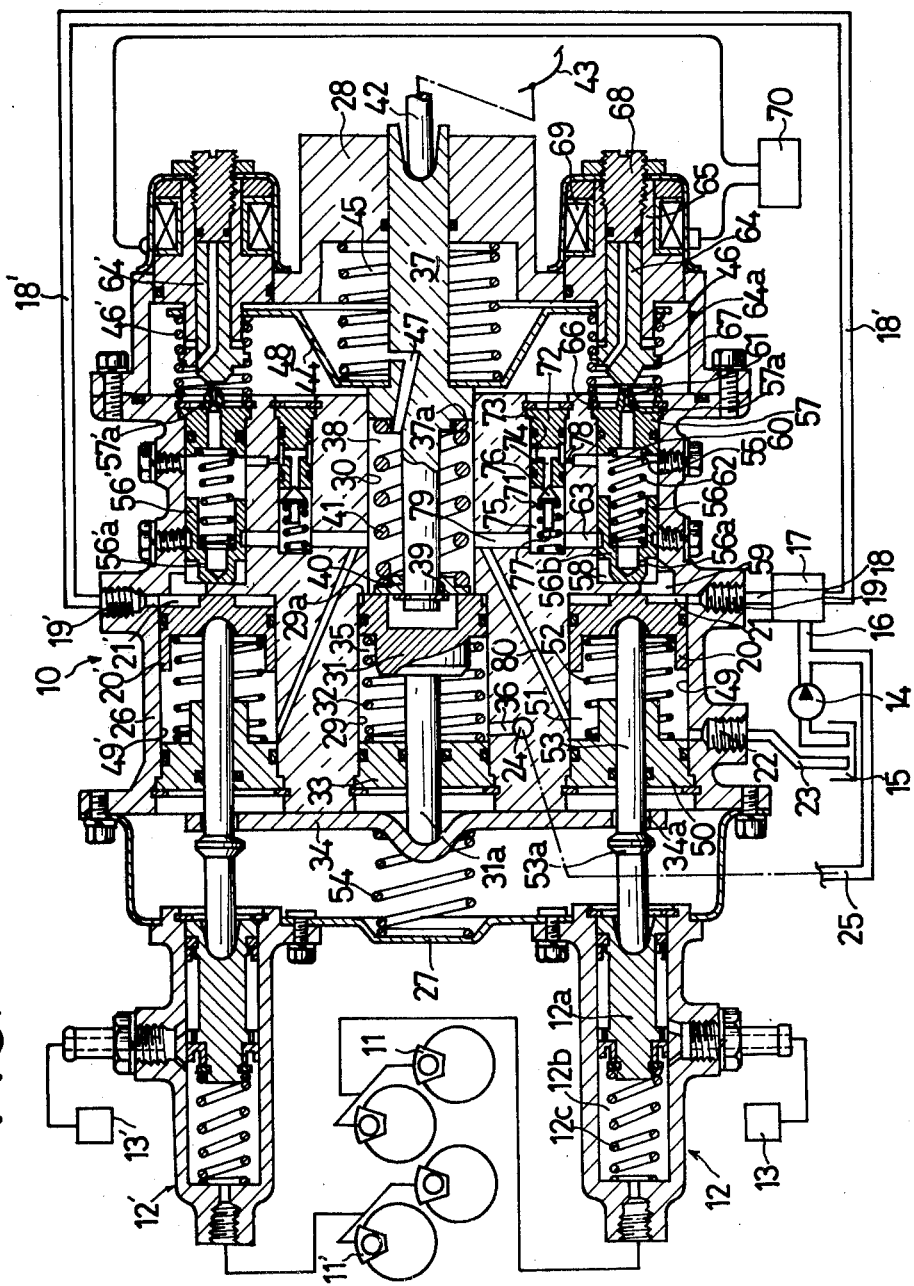
FIG. 1 is a schematic, partial sectional view of a brake control device with a brake booster for vehicles constructed according to the invention.
FIG. 2 is an enlarged view of a portion of the present invention according to FIG. 1.

Referring now to the drawings, and more particularly to FIG. 1 thereof, the reference numeral 10 denotes a brake booster utilized in a vehicle. This vehicle has front and rear wheel brake cylinders 11, 11' and master cylinders 12, 12' fluidically and operatively connected thereto, respectively. The master cylinder 12 includes a piston 12a, a hydraulic chamber 12b and a spring 12c. Reservoir tanks 13, 13' serve to supply the hydraulic fluid to the master cylinders 12, 12'. The master cylinders 12, 12' are operatively arranged with the brake booster 10.

The numeral 14 is a pump as a source of fluid pressure and is driven by an engine of the vehicle, not shown, and supplies the hydraulic fluid within a reservoir 15 to a flow divider 17 through a conduit 16. The flow divider 17 supplies the hydraulic fluid from the pump 14 to conduits 18, 18' at a certain dividing ratio. The conduits 18, 18' are connected to ports 19, 19' of the brake booster 10, respectively, so that the hydraulic fluid within the conduits 18, 18' is applied to an actuating chamber 21 of a power piston 20 for front wheel brake cylinder 11 and to an actuating chamber 21' of a power piston 20' for rear wheel brake cylinder 11' and is returned from an outlet port 22 to the reservoir 15 through a conduit 23. A port 24 of the brake booster 10 is connected to the conduit 16 through a conduit 25 and is supplied with the hydraulic fluid pressure from the pump 14. A shell 27 and a cover 28 are fixedly attached to both sides of a body 26, respectively, and the cover 28 is attached to the vehicle body, not shown. The body 26 has stepped bores 29, 30 at a central inner portion thereof and a piston 31 is sealingly and slidably inserted into the bore 29. The piston 31 is urged by an urging force of a spring 32 to be able to contact with a stepped portion 29a provided between the bores 29, 30. One end of the spring 32 contacts a plug 33 airtightly fixed to the body 26. A rod 31a of the piston 31 passes through the plug 33 and contacts a lever 34. The numeral 35 is a hydraulic chamber defined by the bore 29, the piston 31 and the plug 33 and is communicated with the port 24 through a hole 36. A manual operating member 37 is slidably inserted into the bore 30, and a hydraulic chamber 38 is bounded by the bore 30, piston 31 and the manual operating member 37.

The manual operating member 37 is rightwardly urged by a spring 41 between a retainer 40 and a shoulder 37a of the manual operating member 37. A stop ring 39 is provided for limiting the leftwardly movement of the retainer 40 and the spring 41. The spring 41 has a suitable compression in proportion to the operating force by a vehicle driver, thereby easily attaining the brake assisting actuation. The manual operating member 37 passes through the cover 28 and is operatively connected to a brake pedal 43 through a rod 42. A spring 45 is interposed between the other shoulder 37b of the manual operating member 37 through a plate member 44 and an inner wall of the cover 28. The biasing force of the spring 45 is larger than that of springs 46, 46' recited hereinbelow but is smaller than that of the spring 32. The spring 45 urges the retainer 40 against the piston 31 through the manual operating member 37 and the spring 41. The numeral 47 is a hole provided in the inner portion of the manual piston 37 and is communicated with the hydraulic chamber 38 and a hydraulic chamber 48 defined by the body 26 and the cover 28. The power pistons 20, 20' are slidably inserted into bores 49, 49', respectively.

Just the construction according to the master cylinder 12 for front wheel brake cylinder 11 will be described hereinbelow in detail.

As above described, the power piston 20 is air-tightly and slidably inserted into the bore 49 and the actuating chamber 21 is formed at the one side of the power piston 20. The numeral 50 is a plug air-tightly fixed to an opening end of the bore 49, and a hydraulic chamber 51 is defined by the bore 49, the plug 50 and the power piston 20. A spring 52 is interposed between the plug 50 and the power piston 20 and urges rightwardly the power piston 20. A rod 53 is air-tightly and movably passes through the plug 50 and one end of the rod 53 is engaged with the power piston 20 and the other end thereof is operatively connected to the master cylinder 12 fixed to the shell 27. The rod 53 passes through a hole 34a of the lever 34. The rod 53 has an enlarged portion 53a between the enlarged portion 53a and the master cylinder 12. The lever 34 is normally interposed between the lever 34 and the shell 27. However, when, for instance, the pump 14 is damaged and hydraulic fluid pressure is not obtained, the urging force of the spring 41 overcomes the urging force of the spring 54 so that the lever 34 is leftwardly moved following the leftward movement of the piston 31 by the manual operating member 37 and contacts the enlarged portion 53a of the rod 53, thereby transmitting force to the piston 12a the master cylinders 12, 12'.

The hydraulic chamber 51 is communicated with the reservoir 15 through the port 22 and the conduit 23 and the hydraulic chamber 21 is communicated with the flow divider 17 through the port 19 and the conduit 18. A flow control valve 56 having a fixed orifice 56a therein is slidably inserted into a bore 55 provided in the body 26 and a hollow seat 57 forming a valve seat 57a is fixed to the body 26 as best seen from FIG. 2. The numeral 58 is a hydraulic chamber defined by the body 26 and a flow control valve 56 and communicated with the actuating chamber 21 through a hole 59 provided in the body 26. A hydraulic chamber 60 is defined by the body 26, the flow control valve 56 and the hollow seat 57 and is communicated with the hydraulic chamber 58 through the fixed orifice 56a of the flow control valve 56 and also with the hydraulic chamber 48 through a passage 61 of the hollow seat 57. A spring 62 is interposed between the flow control valve 56 and the hollow seat 57 and urges leftwardly the flow control valve 56 so as to close the communication between the hydraulic chamber 58 and a hole 63 provided on the body 26 by a land 56b of the flow control valve 56.

When the hydraulic fluid pressure within the hydraulic chamber 58 exceeds a predetermined value against the hydraulic fluid pressure within the chamber 55, the hydraulic chamber 58 and the hole 63 are communicated with each other and the effect of the variable orifice is attained. The valve seat 57a and a movable pressure control valve 64 is normally open and at this time the passage 61 is capable of communicating with the hydraulic chamber 48. The movable pressure control valve 64 is slidably inserted into a guide member 65 fixed to the cover 28, and the force of a spring 67 between a stop ring 66 fixed to the body 26 and a projecting portion 64a of the movable pressure control valve 64 overcomes the force of the spring 46 between the projecting portion 64a of the movable pressure control valve 64 and the plate member 44 and thereby the movable pressure control valve 64 is rightwardly urged so as to contact with a core 68 fixed to the guide member 65. Accordingly, when the brake pedal 43 is depressed, the spring 41 is compressed in accordance with the depressing force of the brake pedal 43 and then the manual operating member 37 is leftwardly moved and the plate member 44 is also leftwardly moved by the urging force of the spring 45, whereby the same displacement as the manual operating member 37 is applied to the spring 46 and the urging force of the spring 46 is proportionately increased. Accordingly, the urging force of the spring 46 becomes larger than that of the spring 67 and the movable pressure control valve 64 is close to contact with the valve seat 57a of the hollow seat 57 and the distance of the hollow seat 57 and the movable pressure control valve 64 is narrowed by the leftward movement of the movable pressure control valve 64. The depressing force supplied to the brake pedal 43 is proportionately decreased by the springs 41, 46 through the manual operating member 37 and the plate member 44, and then the movable pressure control valve 64 is actuated. The numeral 69 is solenoid coil fixed to the outer side of the guide member 65 and is electrically connected with a well known logic circuit 70. The logic circuit 70 is connected with sensors of the vehicle wheels respectively, not shown, and the change of the electric current is supplied to the solenoid coil 69 by the logic circuit 70 according to the state of locking or impending locking of the vehicle wheel or wheels and the movable pressure control valve 64 is returned to the core 68.

The numeral 71 is a bore provided on the body 26 and a seat member 72 is sealed to the opening end of the bore 71. A hydraulic chamber 73 is formed in the outer groove portion of the seat 72 and an inner hole 74 communicated with the hydraulic chamber 73 is formed on the inner portion of the seat 72. The numeral 75 is a hydraulic chamber defined by the body 26 and the seat 72 and is capable of communicating with the inner hole 74 through a relief valve 76. The relief valve 76 is arranged to close the inner hole 74 by the force of the spring 77, however, when the hydraulic fluid pressure within the hydraulic chamber 73 reaches a predetermined pressure, the relief valve 76 is leftwardly moved against the force of the spring 77, and then the inner hole 74 and the hydraulic chamber 75 are communicated. The numeral 78 is an orifice provided in the body 26 and connects the hydraulic chambers 60, 73. The hydraulic chamber 75 is communicated with the hydraulic chamber 58 through the hole 63 by the variable orifice effect and with the hydraulic chamber 51 through the hole 79 connected to the hydraulic chamber 38 and through a hole 80 diverging from the hole 79, respectively.

The operation according to the invention will now be described hereinbelow in detail.

In the non-actuating state of the brake control device according to the invention, the hydraulic fluid within the reservoir tank 15 is supplied to the conduit 16 by the pump 14 as a source of hydraulic fluid and is divided by the flow divider 17. The hydraulic fluid within the reservoir 15 is transmitted into the actuating chamber 21 through the port 19 of the brake booster 10 and further transmitted into the hydraulic chamber 58 through the hole 59. The hydraulic fluid within the hydraulic chamber 58 is transmitted into the hydraulic chamber 60 through the fixed orifice 56a and further transmitted into the hydraulic chamber 48 through the passage 61 of the hollow seat 57, the pressure control valve defined by the valve seat 57a of the hollow seat 57 and the movable pressure control valve 64. At this time, as the hydraulic fluid is passed through the fixed orifice 56a, the pressure difference between the hydraulic chamber 58 and the hydraulic chamber 60 occurs. This pressure difference between the hydraulic chamber 58 and the hydraulic chamber 60 opposes the force of the spring 62 which normally urges the flow control valve 56 to the leftward direction and when this pressure difference reaches a predetermined value, the flow control valve 56 is rightwardly moved against the biasing force of the spring 62 and then the orifice defined between the flow control valve 56 and the hole 63 is varied, whereby the hydraulic chamber 58 and the hole 63 are communicated to each other so that the pressure difference between the hydraulic chamber 58 and the hydraulic chamber 60 is maintained at a fixed value. And, when the quantity of the hydraulic fluid passing through the fixed orifice 56a from the hydraulic chamber 58 to the hydraulic chamber 60 is small and is maintained at a fixed value, the quantity of the hydraulic fluid passing from the hole 61 to the pressure control valve defined between the valve seat 57a of the hollow seat 57 and the movable pressure control valve 64 is also small and is maintained at a fixed value. Accordingly, the hydraulic fluid supplied to the hydraulic chamber 58 is on one side transmitted from the fixed orifice 56a to the hydraulic chamber 48 through the hydraulic chamber 60, the passage 61 and further to the hole 47, the hydraulic chamber 38, and is on the other side sent back to the reservoir tank 15 through the hole 63 after throttling by the variable orifice, the hydraulic chamber 75, the hole 79 and then through the hole 80, the hydraulic chamber 51, the port 22 and the conduit 23. The hydraulic fluid pressure within the hydraulic chamber 48, the hole 47, the hydraulic chamber 38, the hydraulic chamber 75, the hole 79, and the hole 80, is always 0 kg/cm². The pressure difference occurs between the hydraulic chamber 58 and the hydraulic chamber 60 by the fixed orifice 56a of the flow control valve 56 and the hydraulic fluid pressure within the actuating chamber 21 is increased more than the hydraulic fluid pressure within the hydraulic chamber 51 (0 kg/cm²) by the predetermined pressure. However, in the present invention the predetermined pressure is as small as possible. Shortly, a leftward axial force acts on the power piston 20 receiving pressure difference but the force of the spring 52 is larger than the axial force. Therefore, the power piston 20 is not actuated and the master cylinder 12 operatively connected with the power piston 20 is not activated so that the state as illustrated in FIG. 1 is maintained.

The flow divider 17 generates, generally, a small pressure difference between the conduit 16 and the conduit 18', as a result, the hydraulic pressure within the hydraulic chamber 35 connected from the conduit 16 through the port 24, the hole 36 by the conduit 25 is higher than the hydraulic fluid pressure within the hydralic chamber 38 (0kg/cm²) opposed by the piston 31 in addition to the pressure difference between the hydraulic chamber 58 and the hydraulic chamber 60. This pressure difference operates to maintain the rightward position of the piston 31, namely, the non-actuating position.

Next, the operation upon actuation of the brake control device will be described hereinbelow in detail.

When the brake pedal 43 is depressed by a vehicle driver, the manual operating member 37 is leftwardly moved through the rod 42. Upon increasing the depressing force of the brake pedal 43, one end of the spring 41 is retained by the piston 31 through the retainer 40 so that the spring 41 is compressed in proportion to the depressing force of the brake pedal 43. With the leftward movement of the manual operating member 37, the plate member 44 held by the manual operating member 37 is also leftwardly moved until the spring 45 is extended. Therefore, the urging force of the spring 46 is increased in proportion to the displacement of the plate member 44 and the movable pressure control valve 64 is leftwardly moved against the urging force of the spring 67. Accordingly, the movable pressure control valve 64 is brought closer to the valve seat 57a of the hollow seat 57 and actuates to close the passage 61 and restricts the hydraulic fluid flowing from the hydraulic chamber 60 to the hydraulic chamber 48 and then the hydraulic fluid pressure within the hydraulic chamber 60 is increased. This increased pressure within the hydraulic chamber 60 is in proportion to the load which the movable pressure control valve 64 is urged toward the valve seat 57a of the hollow seat 57 by the spring 46. At this time, assuming that the effective area of the valve seat 57a formed on the hollow seat 57 is ($A$) and the load supplied on the movable pressure control valve 64 is ($F$) as shown in FIG. 2, the hydraulic fluid pressure ($P$) within the hydraulic chamber 60 is defined by the formula:$P=F/A$. And when the pressure difference between the hydraulic chamber 58 and the hydraulic chamber 60 occurs by the increased pressure within the hydraulic chamber 60, the flow control valve 56 is rightwardly moved against the spring force of the spring 62 until the pressure difference comes constant. Namely, the passage between the hydraulic chamber 58 and the hole 63 is closed or opened by the movement of the flow control valve 56 and by the fuction of a variable orifice of the land 56b. However, the passage is opened and the pressurized fluid within the hydralic chamber 58 is transmitted into the hole 63 just when the pressure difference between the hydraulic chamber 58 and the hydraulic chamber 60 reaches a constant value. When the pressure difference between the hydraulic chamber 58 and the hydraulic chamber 60 reaches a fixed value, the fluid passing through the fixed orifice 56a of the flow control valve 56 is constant even if the fluid pressure within the hydraulic chamber 60 is increased, and the fluid pressure within the hydraulic chamber 58 is maintained by adding the fixed pressure to the fluid pressure within the hydraulic chamber 60. At this time, assuming that the fixed pressure is ($Po$), the fluid pressure within the hydraulic chamber 58 is defined by the formula: $P+Po=F/A+Po$. As a result, the fluid pressure within the actuating chamber 21 is equal to the fluid pressure within the hydraulic chamber 58 and is increased in proportion to the operating force of the manual operating member 37. And then the power piston 20 overcomes the urging force of the spring 52 within the increase of the fluid pressure within the actuating chamber 21 and the master cylinder 12 is activated through the rod 53 by the power piston 20 and the braking force is applied to the front wheel brake 11 (at the same time, the rear wheel brake cylinder 11' is activated and the vehicle is braked.)

When the fluid pressure within the hydraulic chamber 60 is increased and reaches the upper predetermined pressure, at the same time the fluid pressure within the orifice 78, the hydraulic chamber 73 and the inner hole 74 comes to the same high pressure and overcomes the urging force of the spring 77 acting on the relief valve 76, thereby the high hydraulic fluid within the inner hole 74 is passed into the hydraulic chamber 75. Thus, the upper limit of the fluid pressure within the hydraulic chamber 60 is determined and the excess load does not act on the pump 14.

During above-mentioned actuation of the brake control device, the piston 31 receives the gradually increased urging force of the spring 41, and the discharging pressure of the pump 14 is increased by the proportional increase of the fluid pressure of the hydraulic chambers 58, 60 as aforementioned. This increased discharge pressure of the pump 14 is transmitted into the hydraulic chamber 35 through the conduits 16, 15, the port 24 and the hole 36 and opposes the urging force of the spring 41 so that the non-actuating state illustrated in FIG. 1 is maintained. Therefore, the fluid pressure in the hydraulic chamber 35 raises the increased discharge pressure to a value which is larger than the increased urging force of the spring 41. Accordingly, the spring 41 held by the retainer 40 at the one end thereof is compressed by the manual operating member 37 by a relatively small displacement, however, the power piston 21 is actuated in proportion to the brake pedal 43 for assisting the moving force thereof.

When the operating pedal 43 is released by a vehicle driver, the passage is formed at the valve seat 57a of the hollow seat 57 by the movable pressure control valve 64, whereby, the pressure difference between the hydraulic chamber 60 and the hydraulic chamber 48 connected to the reservoir 15 becomes zero and the fluid pressure within the hydraulic chamber 58 is decreased to a small predetermined pressure. As a result, the power piston 20 is returned in the direction for releasing the actuation of the master cylinder 12 by the force of the spring 52 and comes to the non-actuating state as above mentioned.

When at least one front wheel provided with the front wheel brake cylinder 11 is locked or likely to be locked while the high pressure is generated within the actuating chamber the actuation of the brake control device and the master cylinder 12 is actuated by the power piston 20 (it is the same when at least one rear wheel provided with the rear wheel brake cylinder 11' is locked or likely to be locked), the electric current according to the state of locking is supplied to the solenoid coil 69 by the logic circuit 70 and then the movable pressure control valve 64 is pulled back to the core 68 against the force of the spring 46 by the force of the electric current value supplied to the solenoid coil 69 and the force of the spring 67. At this time, assumed that the force for returning the movable pressure control valve 64 is ($Fs$) and the fluid pressure within the actuating chamber 21 just before the solenoid coil 69 is energized is represented by the formula: $P+Po=F/A+Po$ as abovementioned, the fluid pressure within the actuating chamber 21 after the solenoid coil 69 is energized is represented by the formula: $P+Po=F-Fs/A+Po$ and is decreased. It means that the actuating force of the power piston 20 against the master cylinder 12 is decreased and the braking force generated on the front wheel brake 11 is decreased. In short, when the electric current value supplied to the solenoid coil 69 is increased from detecting point of the locking state of a wheel, by the logic circuit 70, the actuating force of the power piston 20 is decreased and the state of wheel lock is released, since then the electric current value supplied to the solenoid coil 69 is decreased by the logic circuit 70 and the actuating force of the power piston 20 is increased. Such above-mentioned operation is repeated and the locking of the wheel is prevented and the most suitable braking force is obtained When the pump 14 as a source of fluid pressure is damaged and in this state the brake pedal 43 is depressed by a vehicle driver, the manual operating member 37 is leftwardly moved against the urging force of the spring 41. Then the movable pressure control valve 64 is seated on the valve seat 57a of the hollow seat 57 by the urging force of the spring 46 through the plate member 44 and the passage 61 is closed. However, the pump 14 is damaged so that fluid pressure is not generated by the pump 14 and is not supplied to the conduit 16, the flow divider 17, the conduit 18, the actuating chamber 21, the hydraulic chamber 58, and the hydraulic chamber 60 and by the pump 14, to the conduit 16, the conduit 25, the port 24 and the hydraulic chamber 35. When the operating force of the manual operating member 37 transmitted through the spring 41 exceeds the urging force of the spring 32 and the spring 54, the piston 31 is leftwardly moved. Therefore, the lever 34 receives the operating force of the manual operating member 37 and is connected with the swelling portion 53a of the rod 53 and the master cylinder 12 are operatively actuated.

According to the invention, most of the pressurized fluid supplied from the pump 14 as a source of hydraulic fluid to the actuating chamber 21 of the power piston 20 of the brake booster 10 is returned to the passage 61 communicated with the reservoir tank 15 through the variable orifice defined by the hole 63 and the land 56b of the flow control valve 56 and only a little hydraulic fluid from the fixed orifice 56a mounted on the flow control valve 56 is supplied to the normally open pressure control valve defined between the valve seat 57a of the hollow seat 57 and the movable pressure control valve 64, so that the pressure control valve may be so small that the area of the hydraulic fluid reaction force has a small value. Therefore, the operating force of the movable pressure control valve 64 proportionally decreased by the springs 41, 46 against the depressing force of the operating pedal 43 is so small that when the logic circuit 70 is electrically connected in the anti-skid operation, the pressure control valve is able to respond to the relatively small return force in the opening direction by the solenoid coil 69. Also, the pressurized fluid within the actuating chamber 21 acting on the power piston for actuating the master cylinders 12, 12' during anti-skid operation is capable of being controlled in accordance with the electric current value electrically connected to the solenoid coil 69 by a signal of the logic circuit 70. Also the pressure control valve and the anti-skid valve are integrally formed so that the brake control device which is simple in construction and low in cost are obtained and the pressure varying speed of the hydraulic fluid within the actuating chamber 21 is selectively changed by a signal of the logic circuit 70.

Obviously, many modifications and variations of the present invention are possible in light of the above teachings. It is to be understood therefore, that within the scope of the appended claims, the present invention may be practiced otherwise than as specifically described herein.

What is claimed is:

1. A brake control device having a pump driven by a vehicle engine and a reservoir, comprising:
   a manual operating means including a brake pedal actuated by a vehicle driver;
   wheel brake cylinders for the brakes of the wheels of the vehicle;
   operating means operatively connected with said brake pedal for actuating said wheel brake cylinders;
   pressure control valve means operatively connected with said operating means and including a hollow seat member provided with a normally open passage therethrough and a valve seat thereon, said valve seat cooperating with a first valve member for selectively controlling the amount of flow of hydraulic fluid from said pump to said reservoir;
   flow control valve means fluidly communicating with said pump and including a second valve member cooperating with a valve seat and forming a variable orifice for controlling communication between said pump and said reservoir and a fixed orifice associated with said second valve member for restricting the flow of hydraulic fluid supplied to the normally open passage of said pressure control valve means;
   power chamber means in hydraulic communication with said pump; said second valve member being responsive to the pressure in said power chamber means and the amount of flow through said passage for varying the opening of said variable orifice;
   power piston means reciprocable in said power chamber means and disposed between said pump and said flow control valve means, said power piston means being operable by said first valve member which selectively restricts the flow of hydraulic fluid from said pump to said reservoir via said variable orifice and said passage; and
   master cylinders connected to and selectively operable by said power piston means for supplying fluid pressure to said wheel brake cylinders, whereby the variable orifice of said flow control valve means is controlled according to the movement of said pressure control valve means.

2. A brake control device according to claim 1, further comprising plate means and a biasing member disposed between said plate means and said pressure control valve means for controlling said pressure control valve means.

3. A brake control device according to claim 2, further comprising a biasing means acted on by said manual operating means as a reaction force at the one end thereof, and a piston contacting the other end of said biasing means for acting on said master cylinders upon failure of said pump.

4. A brake control device according to claim 3, and further comprising means for releasing said pressure control valve means from said operating means when said wheel brake cylinders are in a locked state.

5. A brake control device according to claim 4, wherein said releasing means comprises a logic circuit for generating a signal to actuate said pressure control valve means.

* * * * *